United States Patent [19]
Andersson

[11] 3,765,451
[45] Oct. 16, 1973

[54] MIXING VALVE FOR TWO GASES

[76] Inventor: Lennart Valentin Andersson, 209, 136 66 Handen, Stockholmsvagen, Sweden

[22] Filed: Nov. 15, 1972

[21] Appl. No.: 306,722

[52] U.S. Cl......... 137/625.4, 137/829, 235/201 ME
[51] Int. Cl. .............................................. F15c 3/00
[58] Field of Search.................... 137/625.4, 625.41, 137/625.48, 804, 829, 830, 832; 235/201 ME

[56] References Cited
UNITED STATES PATENTS

| | | | |
|---|---|---|---|
| 2,920,651 | 1/1960 | Welsh............................ | 137/625.4 X |
| 3,126,914 | 3/1964 | Dombre........................... | 137/625.4 |
| 3,319,644 | 5/1967 | Thorburn......................... | 235/201 ME |
| 3,384,116 | 5/1968 | Fedoseev et al. ............... | 235/201 ME |
| 3,545,491 | 12/1970 | Broerman........................ | 137/625.48 |
| 3,460,572 | 8/1969 | Hartman.......................... | 137/625.48 |
| 3,570,518 | 3/1971 | Hatch, Jr. ....................... | 235/201 ME |
| 3,587,650 | 6/1971 | Denker........................... | 137/625.48 X |
| 3,593,734 | 7/1971 | Sanford........................... | 235/201 ME |
| 3,710,123 | 1/1973 | Miller.............................. | 235/201 ME |

*Primary Examiner*—Samuel Scott
*Attorney*—Joseph L. Strabala et al.

[57] ABSTRACT

A mixing valve having a gas outlet for a gas mixture and two separate gas inlets for two gases at the same pressure can deliver variable flow with a constant mixing ratio by employing a revolving stepped shaft, reciprocally mounted in a valve housing which is arranged to control a circular valve element in relation to a valve seat in which the two gas inlets are located at spaced intervals from one another, so the valve element can be inclined when raised off the valve seat to maintain the mixing ratio constant and rotated in relation to the valve seat to change the ratio.

9 Claims, 2 Drawing Figures

PATENTED OCT 16 1973　　　　　　　　　　　　　　　3,765,451

3,765,451

MIXING VALVE FOR TWO GASES

BACKGROUND OF THE INVENTION

The invention relates to a mixing valve with a gas outlet for mixed gas from two separate gas inlets for two different gases maintained at essentially the same pressure and employs a revolving stepped shaft, a valve element and a valve seat mounted in a valve housing.

Gas mixing valves are known which work on the principle that, on change of the setting of the mixing ratio, the free flow area through one inlet diminishes in relationship to an increase of free flow area through the other inlet. Furthermore double-acting needle valves are known in which a valve element moves between two valve seats and, on change of the setting, the two free flow areas vary in proportion to one another.

A disadvantage of such valves is that at a constant ratio setting of the valves, the mixing ratio between the gases varies as the flow through the valve changes. To obtain reasonably constant mixing ratios, therefore, such valves must be designed and constructed for narrowly limited variations in flow.

This deviation is especially large if the gases are mixed under a positive pressure of about one atmosphere and above, and if a flow regulating unit is placed after or downstream of the mixing valve.

SUMMARY OF THE INVENTION

The object of the present invention is to eliminate these disadvantages, and to provide a gas mixing valve with a constant mixing ratio over a very large range of flow variations. It is also an object to provide a mixing valve which is compatible with the placing of a flow regulating unit after or downstream of the mixing valve, without appreciably affecting the mixing ratio.

This is achieved according to the present invention with a mixing valve chiefly through the use of a circular valve element which is arranged to engage with a valve seat, having the two gas inlets which are symmetrically located at a distance from one another, and a fulcrum that allows the valve element to be successively inclined as it lifts off its valve seat to keep the ratio constant and also means by which the valve element can be rotated relative to the valve seat to change the mixing ratio.

This mixing valve can be used for mixing oxygen and air with a given percentage of oxygen. A relatively high pressure in the gas outlet is required if the mixed gas is used to drive respirators, nebulizers, i.e., air humidifiers, and similar appliances, which need both a high pressure and a widely varying range of flow of mixed gases. The mixing valve according to the invention, is thus usable, with apparatus for oxygen therapy.

A suitable embodiment of the valve seat has a flat valve surface of contact by the circular valve element. Alternatively a surface of contact, which is symmetrical in all directions, can be employed. These constructions involve simple manufacture of the said components and at the same time a good seal between them. To further improve the sealing relationship a spring between the inside of the valve housing and the valve element may be employed in order to press the latter towards its valve seat.

This spring passes through a supporting disc fixed on the revolving stepped shaft between one side of the valve housing and the valve element and thereby serves also as driver on the valve element.

To augment pressure on the valve seat exercised by the spring on the valve element, the revolving stepped shaft provides a differential area so the pressure within the housing can act to urge the supporting disc toward the valve seat. As a consequence thereof the supporting disc is forced by this pressure in the valve housing towards the valve surface, i.e., towards the valve element, which in turn is forced against the valve seat.

As aforementioned, the valve element is tiltable with reference to the axis of the revolving stepped shaft. In order that this tiltability shall not load or bind the spring, the circular valve element, close to the attachment of the spring, has a ridge running along its chord. The ridge preferentially lying between a central aperture through which the revolving shaft is received and the spring as illustrated. Furthermore, this ridge has the function of a fulcrum defining the tilting axis of the valve element so the tilt or inclination always takes place along an axis running parallel with the ridge. The valve element must not be laterally tilted, e.g., about an axis running perpendicular to the ridge, as the mixing ratio will then be disturbed. Instead of a ridge, other means with the same function may be arranged within the scope of the invention, which are also intended to be protected by this application. For example, two elevated projections close to the periphery of the valve element on the side facing the supporting disc may be substituted for the ridge. Also a small hinge, for example, is appropriate for this purpose.

According to the invention the valve element may have an opening which — preferentially in one end-of-revolution position — can be brought in alignment with one of the gas inlets in the valve seat. As the valve has two end-of-revolution positions, the other gas inlet may be appropriately placed so that said opening, in the valve in the other end position, will be in alignment with the second gas inlet. According to a preferred embodiment of the invention the openings of the two gas inlets in the circular valve seat lie diametrically opposite one another, and the opening of the valve element and the attachment of the valve spring to the valve element also lies on the same diameter.

An especially simple embodiment is obtained through the fact that the supporting disc and the revolving stepped shaft are made in one piece, so that the small diameter end of the revolving stepped shaft remote from the valve seat is sealed and passes through and projects from the valve housing so it can be reciprocated therein. Its outboard end can be connected to the knob for setting of the mixing ratio. The other large diameter end of the rotating shaft is sealed and passes through the valve seat so the shaft can be reciprocated as indicated.

The mixing valve according to the invention is used with known types of pressure regulators which keep the gases entering the two inlets at the same or an identical pressure.

Through the fact that the valve element is pressed against the gas inlets in the valve seat, the present mixing valve has a slight pressure-reducing effect and the gases therefore have a slightly higher pressure upstream of the mixing valve. This feature is desirable in that, at low flows, it ensures that the pressure of one of the gases will not obstruct the flow of the other gas, as is the case with conventional mixing valves with throttling gaps to selected free flow areas. The mixing valve according to the invention may be said to be selfregulating as it automatically opens and closes according to the flow rate of the mixed gases.

BRIEF DESCRIPTION OF THE DRAWINGS

The invention will now be explained in greater detail with reference to an arbitrarily selected embodiment reproduced in the attached drawing, wherein.

DETAILED DESCRIPTION

Figure 1:
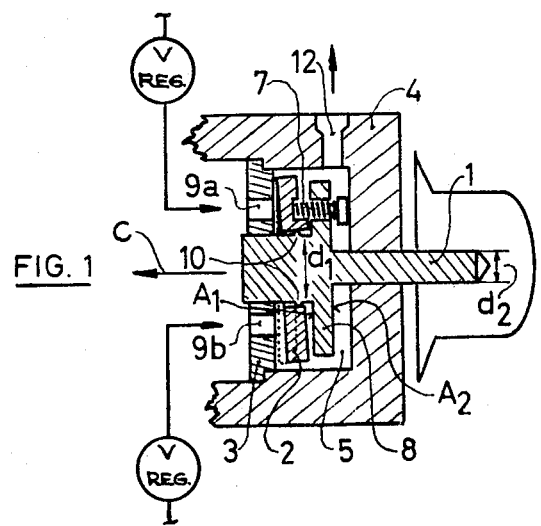
FIG. 1 is a section through a schematically represented embodiment of a mixing valve according to the invention.
Figure 2:
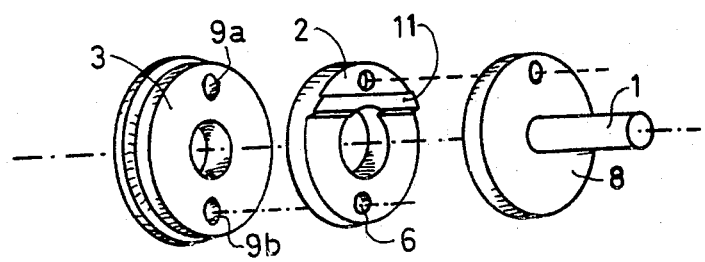
FIG. 2 shows the valve seat, valve element and supporting disc on a stepped shaft in an exploded perspective drawing.

As shown in FIG. 1, a valve element which engages a valve seat 3 is tiltably associated on a revolving stepped shaft 1. These components are surrounded by a valve housing 4 containing a bore or chamber 5. The valve element 2 is also provided a through-opening 6 and a blind bore for a valve spring 7, which also serves as driver and extends through an opening in a supporting disc 8 fixed to the revolving shaft 1. In the valve seat 3 there are two inlets 9a and 9b for two different gases which are to be introduced at the same pressure. A conventional pressure regulator upstream of each inlet ensures that the two gases have the same inlet pressure, and may suitable be located as shown in the drawing. In order that the valve element 2 may tilt, i.e., be angularly disposed with reference to the valve seat, there is on the shaft a flange, ring, or the like, which is denoted 10. There is also on the side of the valve element facing the supporting disc 8 a ridge 11, as seen clearly in FIG. 2, which runs along a chord lying between the spring attachment and the opening or central aperture of the revolving shaft.

As indicated the revolving stepped shaft has a smaller diameter $d_2$ on one side of the supporting disc and a larger diameter denoted $d_1$ on the opposite side. Owing to the different diameters $d_1$ and $d_2$ the areas $A_1$ and $A_2$ of the supporting disc, on the left and right sides respectively, differ. Therefore when a pressure prevailing in chamber 5 acts upon these two surfaces $A_1$ and $A_2$, because $A_1$ is less than $A_2$, the supporting disc is urged to the left in FIG. 1 in the direction of arrow C, i.e., against the valve element, whereby the pressure of the valve spring against the valve element 2 is further augmented without appreciably impeding the tilting of the valve element.

The driver spring 7, at its end facing the wall of the valve housing 4, may be provided with a small plastic plug or the like in order to reduce the friction and prevent scoring of the inside wall of the housing. In the housing 4 there is also a gas mixture outlet 12 communicating with the chamber 5.

The mixing valve according to the invention operates as follows. When gas is withdrawn through the outlet 12, the pressure in the chamber 5 falls, so that the pressure applied to the valve seat side of the valve element via the gas inlets 9a and 9b raises the valve element, allowing it to tilt (see the position shown by the fully drawn line in FIG. 1), so gas flows through the two inlets. In the position shown in FIG. 1 more gas flows in through inlet 9b than through inlet 9a. By turning of the knob of the small diameter shaft end of the rotating shaft, the mixing ratio of the gases entering through inlets 9a and 9b can be varied within desired limits. Practical trials have shown that the mixing ratio is very constant at different flow rates egressing from the outlet. At flows varying as much, for example, as between 1 and 220 liters/minute an accuracy of in mixing ratio ± 2 percent of the maximum scale value has been measured, i.e., at for example a setting of 40 percent a deviation between only 38 and 42 percent was experienced.

The two entering gases flow round the periphery of the valve element 2 past the supporting disc 8 into the chamber 5 and thence to the outlet 12. As flow through the outlet reduces the pressure in the chamber 5 approaches the same pressure as the inlet pressure of the two gases and the valve element moves toward the valve seat 3 to the position shown by the dotted line in FIG. 1, and finally seats on its valve seat 3, closing off the two inlets 9a and 9b. If a gas mixture is again withdrawn through the outlet 12, the valve element will lift off the valve seat adjusting to give a constant ratio.

The rotating shaft 1 is sealed about its small diameter shaft end which passes through the top of the housing 4, while its large diameter shaft end, on which the valve element 2 is telescoped, passes through a central aperture in the valve seat 3. The differential pressure force exercised on surfaces $A_1$ and $A_2$ of the supporting disc will cause the shaft to be directed to the left in FIG. 1 in the direction of arrow C when the outlet flow decreases or stops. This force will always be proportional to the pressure in the chamber 5.

In the FIG. 1 the valve element and its valve seat are shown in flat cooperating surfaces. The invention is, however, not bound to such a form, and spherical or other cooperating valve seats and valve elements may be used which are preferentially symmetrical in all directions.

Although the invention has been described with reference to several of its embodiments, it can nevertheless be varied within the scope of the subsequent claims.

What is claimed is:

1. An adjustable ratio mixing valve for gases maintained at equal pressures comprising:
   a valve housing having a bore therein closed at one end of a portion of said housing having an aperture therein, said housing also having a gas outlet communicating with said bore,
   a stepped diameter shaft having a large diameter shaft end and a small diameter shaft end separated by an integral projecting member, said stepped shaft reciprocally mounted in said bore with said small diameter shaft end received in said aperture,
   a circular valve element having a valving surface on one side and a fulcrum means on the opposite side, said valving element having a central aperture and mounted on said large diameter shaft end so said fulcrum means contacts said projecting member; and
   a circular valve seat means mounted to close said bore having a valving seat surface with two spaced gas inlets, said valve seat means having a central aperture receiving said larger diameter shaft end allowing said stepped shaft to move reciprocally in said bore whereby pressure build-up within said bore due to decreased outlet flow will act on the differential area of said stepped shaft ends to close off said inlets by forcing said valve element against said valve seat and the tilting of said valve element about said fulcrum means will control the ratio of said gas mixture egressing from said outlet.

2. The adjustable ratio mixing valve in claim 1 wherein the two inlets are circumferentially located in the valve seat and equally spaced from one another.

3. The adjustable ratio mixing valve of claim 2 wherein the projecting member is a circular disc.

4. The adjustable ratio mixing valve of claim 2 wherein the fulcrum means is formed by a raised ridge oriented along a chord of said circular valve element outboard of its central aperture.

5. The adjustable ratio mixing valve of claim 2 wherein the valving surface of said valve seat is flat and the valving surface of the valve element is also flat whereby these two surfaces vary in angular disposition as said element tilts.

6. The adjustable ratio mixing valve of claim 5 wherein the large diameter shaft end includes a small radial ring centrally locating said valve element thereon which allows said element to tip about its fulcrum point so one edge of said circular valve element is in contact with the valve seat means.

7. The adjustable ratio mixing valve of claim 5 wherein bias means contact said circular valve element outboard of the fulcrum means and is operable to force one edge of said valve element against the valve means.

8. The adjustable ratio mixing valve of claim 2 wherein one end of the stepped shaft includes manual means to commonly rotate said stepped shaft and contiguous valve element to change the mixing ratio.

9. The adjustable ratio mixing valve of claim 8 wherein the circular valve element includes an aperture therethrough which can be aligned with a gas inlet as said circular valve element is rotated in said bore.

* * * * *

PO-1050
(5/69)

UNITED STATES PATENT OFFICE
CERTIFICATE OF CORRECTION

Patent No. 3,765,451     Dated  October 16, 1973

Inventor(s)   Lennart Valentin Andersson

It is certified that error appears in the above-identified patent and that said Letters Patent are hereby corrected as shown below:

On the title page, on the lines following "[21] Appl. No.: 306,722" insert:

-- [32] Priority  December 16, 1971

[33] Sweden

[31] 16185/71      --

Signed and sealed this 9th day of April 1974.

(SEAL)
Attest:

EDWARD M.FLETCHER,JR.
Attesting Officer

C. MARSHALL DANN
Commissioner of Patents